United States Patent
Hsu et al.

(10) Patent No.: US 7,664,519 B2
(45) Date of Patent: Feb. 16, 2010

(54) POWER CONTROL FOR MULTIPLE TRANSPORT CHANNELS IN A WIRELESS COMMUNICATION SYSTEM

(75) Inventors: Chih-Ping Hsu, San Diego, CA (US); Parvathanathan Subrahmanya, Sunnyvale, CA (US); Da-shan Shiu, Cupertino, CA (US); Hyukjun Oh, Santa Clara, CA (US); Christopher C. Riddle, San Diego, CA (US); Nitin Kasturi, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 10/750,302

(22) Filed: Dec. 30, 2003

(65) Prior Publication Data

US 2005/0143116 A1 Jun. 30, 2005

(51) Int. Cl.
*H04B 1/00* (2006.01)
*H04B 1/04* (2006.01)
*H04Q 7/20* (2006.01)

(52) U.S. Cl. ............... 455/522; 455/69; 455/127.1; 455/67.11

(58) Field of Classification Search ............ 455/522, 455/69, 127.1, 67.11; 370/335, 351, 342, 370/332; 375/141, 130, 147
See application file for complete search history.

(56) References Cited

U.S. PATENT DOCUMENTS

| 6,385,181 B1 * | 5/2002 | Tsutsui et al. ............. 370/335 |
| 6,542,718 B1 * | 4/2003 | Kuo et al. ................. 455/69 |
| 6,622,024 B2 * | 9/2003 | Koo et al. ................. 455/522 |
| 6,639,934 B1 * | 10/2003 | Engstrom et al. .......... 375/130 |
| 6,748,234 B1 * | 6/2004 | Agrawal et al. ............ 455/522 |
| 6,879,840 B2 * | 4/2005 | Razavilar et al. .......... 455/522 |
| 6,931,257 B2 * | 8/2005 | Shahidi et al. ............ 455/522 |
| 6,961,362 B2 * | 11/2005 | Ariyoshi et al. ........... 375/130 |
| 6,983,166 B2 * | 1/2006 | Shiu et al. ................. 455/522 |
| 7,016,699 B2 * | 3/2006 | Koo et al. ................. 455/522 |
| 7,162,262 B2 * | 1/2007 | Jonsson et al. ............ 455/522 |
| 7,215,929 B2 * | 5/2007 | Rikola et al. ............. 455/67.11 |
| 7,292,552 B2 * | 11/2007 | Willenegger et al. ........ 370/333 |

(Continued)

FOREIGN PATENT DOCUMENTS

EP 1124340 2/2000

(Continued)

*Primary Examiner*—Tilahun Gesesse
(74) *Attorney, Agent, or Firm*—George C. Pappas; Eric Ho

(57) ABSTRACT

Techniques are provided to control the transmit power for data transmission on multiple transport channels having different signal quality (SIR) targets. A single SIR target is maintained for all transport channels, and this SIR target is adjusted based only on active transport channels. For each update interval, a data processor processes at least one data block received in the current update interval on at least one of the transport channels and provides the status of each received data block. A controller increases the SIR target based on an up step if any received data block is erased and decreases the SIR target based on a down step if all received data blocks are good. If any received data block is erased, the down step used to adjust the SIR target may be set to the smallest down step size required by all transport channels with erased data blocks.

31 Claims, 9 Drawing Sheets

U.S. PATENT DOCUMENTS

| | | | |
|---|---|---|---|
| 7,363,010 B2* | 4/2008 | Oh et al. | 455/67.11 |
| 7,406,065 B2* | 7/2008 | Willenegger et al. | 370/335 |
| 2002/0165004 A1* | 11/2002 | Chen et al. | 455/522 |
| 2003/0036403 A1* | 2/2003 | Shiu et al. | 455/522 |
| 2003/0174686 A1* | 9/2003 | Willenegger et al. | 370/342 |
| 2004/0137860 A1* | 7/2004 | Oh et al. | 455/127.1 |
| 2005/0085256 A1* | 4/2005 | Yano et al. | 455/522 |
| 2005/0130690 A1* | 6/2005 | Shinozaki | 455/522 |

FOREIGN PATENT DOCUMENTS

| | | | |
|---|---|---|---|
| WO | 0243275 | | 5/2002 |
| WO | 03021976 | | 3/2003 |
| WO | WO 03/021976 | * | 3/2003 |
| WO | 2004054130 | | 6/2004 |

* cited by examiner

POWER CONTROL FOR MULTIPLE TRANSPORT CHANNELS IN A WIRELESS COMMUNICATION SYSTEM

BACKGROUND

I. Field

The present invention relates generally to communication, and more specifically to techniques for controlling the transmit power of a data transmission on multiple transport channels in a wireless communication system.

II. Background

In a wireless communication system, a user with a terminal (e.g., a cellular phone) communicates with another user via transmissions on the downlink and uplink with one or more base stations. The downlink (i.e., forward link) refers to the communication link from the base station to the terminal, and the uplink (i.e., reverse link) refers to the communication link from the terminal to the base station. In a Code Division Multiple Access (CDMA) system, a base station can transmit data to multiple terminals simultaneously. The total transmit power available at a base station thus determines the downlink capacity of the base station. A portion of the total available transmit power is allocated to each terminal such that the aggregate transmit power for all active terminals is less than or equal to the total available transmit power.

To maximize downlink capacity, a power control mechanism is typically used for each terminal. The power control mechanism is normally implemented with two power control loops, which are commonly referred to as an "inner" loop and an "outer" loop. The inner loop adjusts the transmit power used for the terminal such that the received signal quality (SIR) for a downlink transmission, as measured at the terminal, is maintained at an SIR target. The received signal quality may be quantified by a signal-to-noise-plus-interference ratio or some other quantity. The outer loop adjusts the SIR target to achieve the desired level of performance, which may be quantified by a block error rate (BLER) target or some other performance measurement. By minimizing the amount of transmit power used for the terminal while maintaining the BLER target, increased system capacity and reduced delays in serving users can be achieved. When BLER is too low, the terminal consumes too much system capacity. Conversely, when the BLER is too high, the terminal suffers from unsatisfactory service to the user.

A Wideband CDMA (W-CDMA) system supports data transmission on one or more "transport" channels to each terminal. A transport channel may be viewed as a data/message bearer. Each transport channel is associated with one or more transport formats, and each transport format specifies various processing parameters for that transport channel. A BLER target may also be specified for each transport channel. Each transport channel may require a different SIR target, which is dependent on both the BLER target and the transport formats selected for that transport channel.

In W-CDMA, one or more transport channels are multiplexed onto a "physical" channel. The transmit power for the physical channel (and not the individual transport channels) is adjusted through power control. Power control for a single physical channel carrying multiple transport channels with different SIR targets is challenging.

In one conventional design, a separate outer loop is maintained for each transport channel. The outer loop for each transport channel adjusts the SIR target for that transport channel based on the status of data blocks received on that transport channel. In particular, the SIR target for a given transport channel may be decreased by a small amount if a good data block is received on the transport channel, increased by a large amount if a bad data block is received, and maintained at the same level if no data blocks are received. A final SIR target for the physical channel is then set to the highest SIR target among the SIR targets for all of the transport channels carried by the physical channel. The inner loop then adjusts the transmit power for the physical channel to achieve the final SIR target. The use of the highest SIR target among all transport channels as the final SIR target for the physical channel ensures that the BLER target or better is achieved for all transport channels carried by the physical channel.

The above design works well if all transport channels carried by the physical channel are active at all times. However, if the transport channel with the highest SIR target is inactive or intermittently active, then the SIR target for this transport channel will dominate the power control for the physical channel. This is because the SIR target for this transport channel will be maintained at a high level due to little or no activity on the transport channel. Consequently, the final SIR target will be continually set to the high SIR target for this transport channel. Excess transmit power is then used for the physical channel and system capacity is wasted.

There is therefore a need in the art for techniques to control the transmit power for multiple transport channels multiplexed together.

SUMMARY

Techniques are provided herein to control the transmit power for a data transmission on multiple transport channels having different SIR targets, even when one or more of the transport channels are inactive or intermittently active. In one design, a single SIR target is maintained for all of the transport channels, and this SIR target is adjusted based only on active transport channels. The SIR target is updated at each update interval. A transport channel is considered active if one or more data blocks are received on the transport channel in the current update interval. For each update interval, a data processor processes at least one data block received in the current update interval on at least one of the multiple transport channels. The data processor provides the status of each received data block (e.g., as "good" or "erased", as described below). A controller increases the SIR target based on an up step if any received data block is erased and decreases the SIR target based on a down step if all received data blocks are good. Each transport channel may be associated with a respective down step size, which is computed based on the BLER target and the transport formats for that transport channel, as described below. If any data block received in the current update interval is erased, then the down step used to adjust the SIR target may be set to the smallest down step size among all transport channels with erased data blocks.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
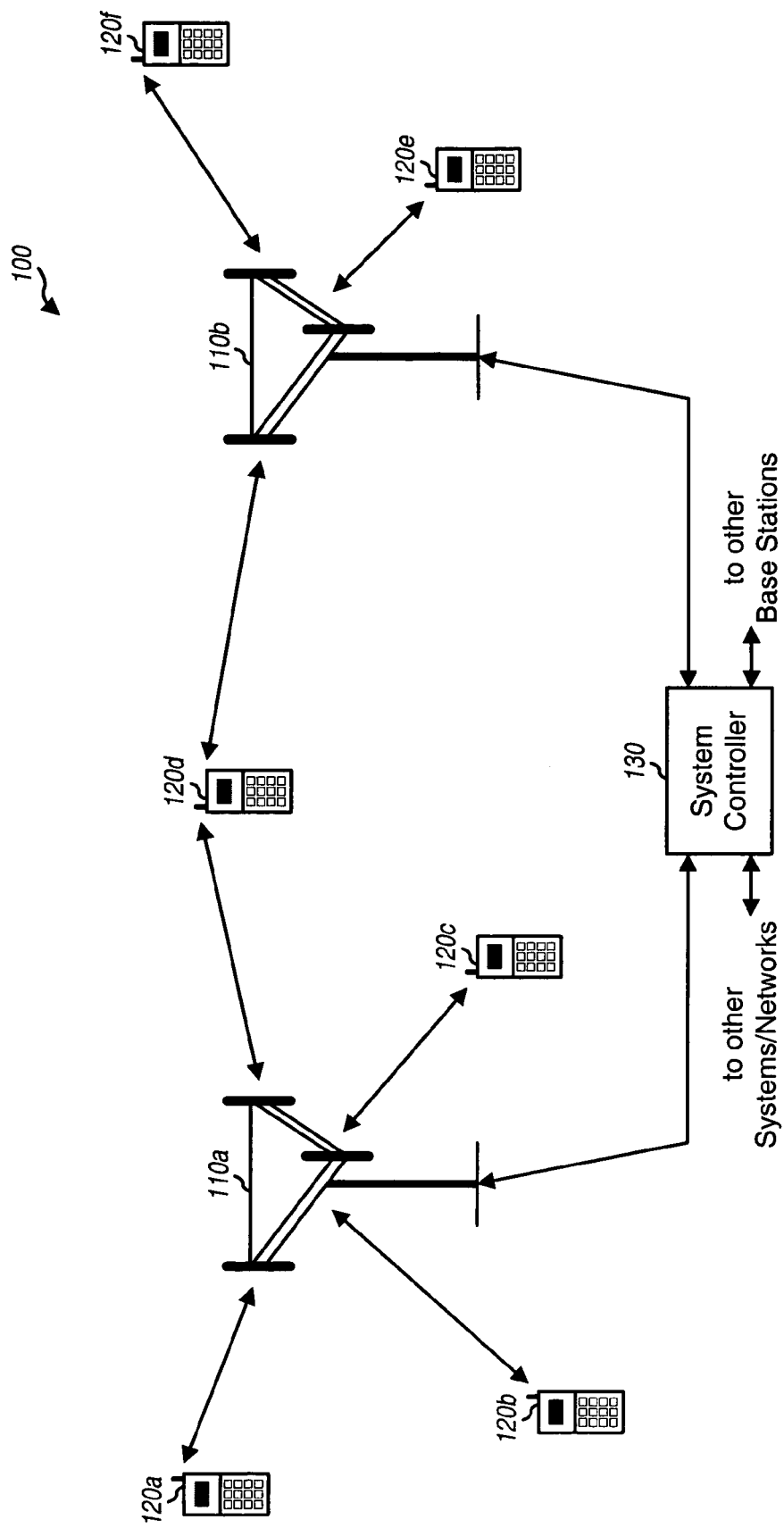
FIG. 1 shows a wireless communication system.

FIG. 1 shows an exemplary wireless communication system 100. System 100 includes a number of base stations 110 that provide communication for a number of terminals 120. For simplicity, only two base stations 110a and 110b and six terminals 120a through 120f are shown in FIG. 1. Each base station 110 provides communication coverage for a respective geographic area. A base station is a fixed station and may also be referred to as a Node B, a base transceiver subsystem (BTS), an access point, or some other terminology. Terminals 120 are typically dispersed throughout the system. A terminal may be fixed or mobile and may also be referred to as a user equipment (UE), a mobile station, a remote station, an access terminal, a wireless communication device, or some other terminology. A terminal may communicate with one or multiple base stations on the downlink and/or one or multiple base stations on the uplink at any given moment.

A system controller 130 couples to base stations 110 and may further couple to other systems and networks, such as a public switched telephone network (PSTN), a packet data serving node (PDSN), and so on. System controller 130 provides coordination and control for the base stations coupled to it and further controls the routing of data to/from the terminals served by these base stations. System controller 130 may also be referred to as a radio network controller (RNC), a base station controller (BSC), or some other terminology.

System 100 may be a CDMA system that may implement one or more CDMA standards such as W-CDMA, IS-2000, IS-856, IS-95, and so on. System 100 may also be a Time Division Multiple Access (TDMA) system that may implement one or more TDMA standards such as Global System for Mobile Communications (GSM). These standards are well known in the art.

The power control techniques described herein may be used for any wireless closed-loop power-controlled communication system that transmits data on multiple channels with different SIR targets. These techniques may also be used for power control on the downlink as well as the uplink. For clarity, these techniques are specifically described below for downlink power control in a W-CDMA system.

In W-CDMA, data to be transmitted to a terminal is processed as one or more transport channels at a higher signaling layer. The transport channels commonly used for data transmission include a dedicated traffic channel (DTCH) and a dedicated control channel (DCCH). The DTCH and DCCH are described in a document 3GPP TS 25.301, which is publicly available. The transport channels may be used to carry data for one or more services (e.g., voice, video, packet data, and so on).

Each transport channel is associated with one or more transport formats, which may be selected during system configuration at the start of a communication session. Each transport format specifies various processing parameters such as (1) the transmission time interval (TTI) over which the transport format applies, (2) the size of each transport block of data, (3) the number of transport blocks within each TTI, (4) the length of each code block, (5) the coding scheme to use for the TTI, and so on. Only one TTI is used for each transport channel, and the selected TTI may span one, two, four, or eight frames. In W-CDMA, each frame is a 10-msec time interval that is identified by a system frame number (SFN). Each transport channel is associated with a transport format set that includes all of the transport formats that may be used for that transport channel. A BLER target may also be specified for each transport channel, which allows different transport channels to achieve different quality of service (QoS).

Figure 2:
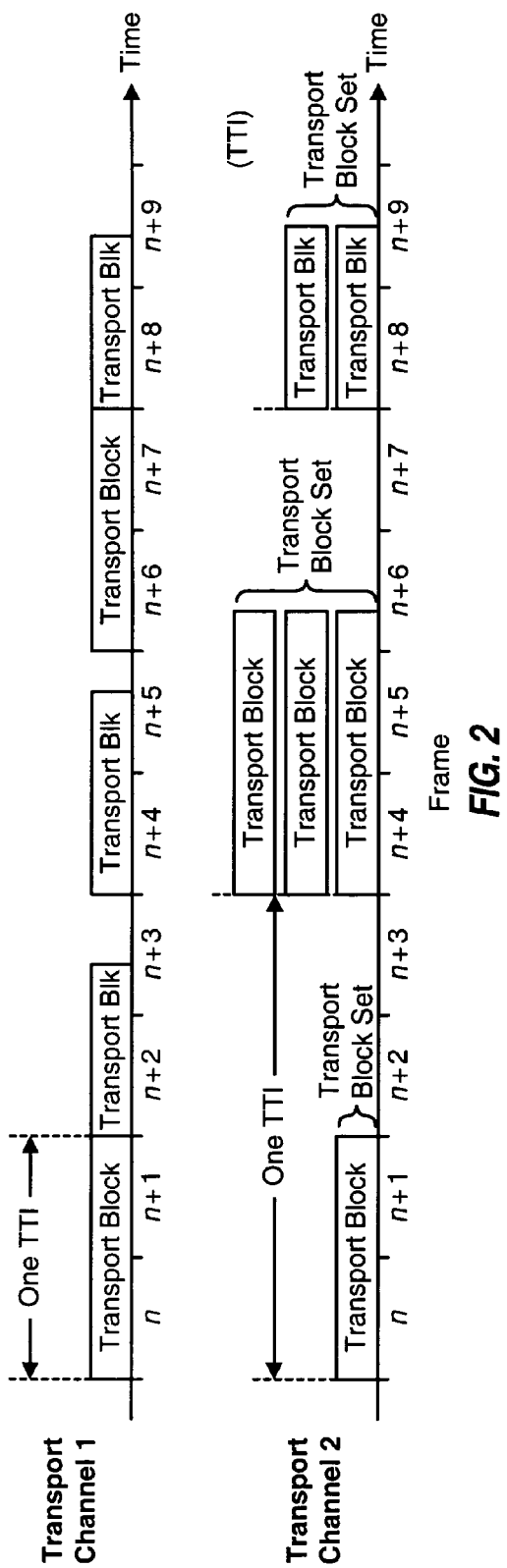
FIG. 2 shows two transport channels with different transport format sets.

FIG. 2 shows two exemplary transport channels 1 and 2 with different transport format sets. In this example, transport channel 1 has a TTI of two frames and transport channel 2 has a TTI of four frames.

In the example shown in FIG. 2, all of the transport formats for transport channel 1 specify one transport block for each TFI. However, each transport format specifies a different transport block size. This transport format set may be used for voice service or some other variable rate service. For voice service, an adaptive multi-rate (AMR) speech coder may provide a full rate frame, a silence descriptor (SID) frame, or a no-data (DTX) frame every 20 msec depending on speech activity. The full rate, SID, and DTX frames have different sizes.

In the example shown in FIG. 2, the transport formats for transport channel 2 specify a different number of transport blocks for each TTI. Each transport format further specifies a different transport block size. This transport format set may be used to support multiple services on a single transport channel.

In W-CDMA, a downlink dedicated physical channel (downlink DPCH) is typically assigned to each terminal for the duration of a communication session. The downlink DPCH carries transport channel data in a time division multiplexed manner with control data. The downlink DPCH is characterized by the possibility of fast data rate change (e.g., every 10 msec frame), fast power control, and inherent addressing to a specific terminal.

Figure 3:
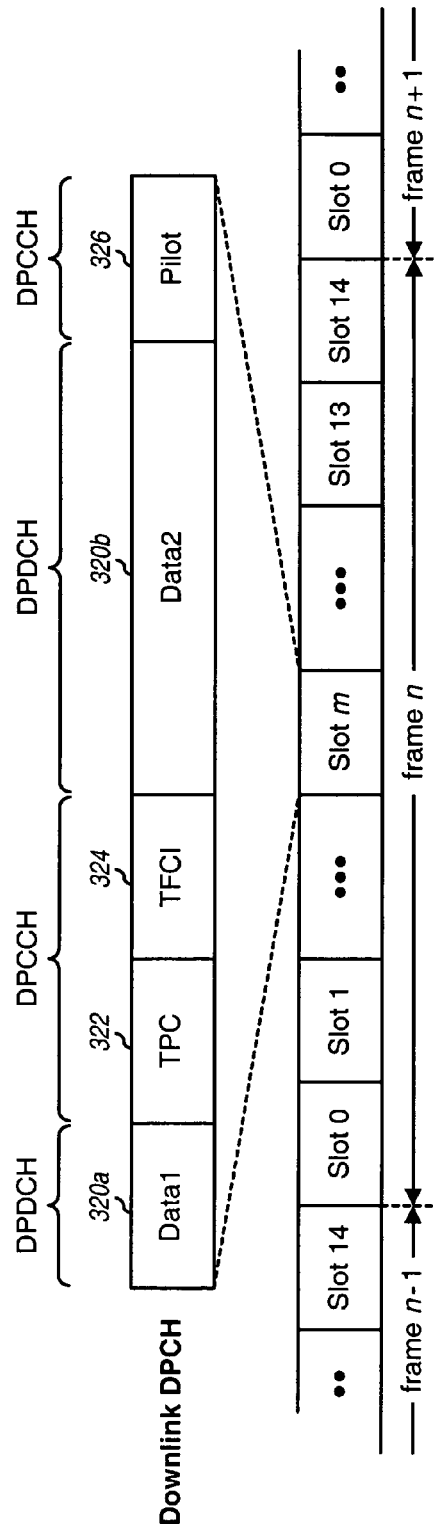
FIG. 3 shows the format for a downlink dedicated physical channel (downlink DPCH) in W-CDMA.

FIG. 3 shows the format for the downlink DPCH in W-CDMA. Data is transmitted on the downlink DPCH in radio frames. Each radio frame is transmitted over a 10 msec frame, which is divided into 15 slots. Each slot is further partitioned into multiple fields for different types of data.

As shown in FIG. 3, for the downlink DPCH, each slot includes data fields 320a and 320b (Data1 and Data2), a transmit power control (TPC) field 322, a transport format combination indicator (TFCI) field 324, and a pilot field 326. Data fields 320a and 320b carry transport channel data, i.e., data for the transport blocks sent on the transport channels carried by the downlink DPCH. TPC field 322 carries a TPC command for uplink power control. This TPC command directs the terminal to adjust its uplink transmit power either up or down to achieve the desired uplink performance. TFCI field 324 carries transport format information for the downlink DPCH. Pilot field 326 carries a dedicated pilot for the terminal. The duration of each field is determined by the slot format used for the downlink DPCH.

As also shown in FIG. 3, the downlink DPCH is a multiplex of a downlink dedicated physical data channel (DPDCH) and a downlink dedicated physical control channel (DPCCH). The transport channel data is mapped to the DPDCH, while the DPCCH carries signaling information from a physical layer.

Figure 4:
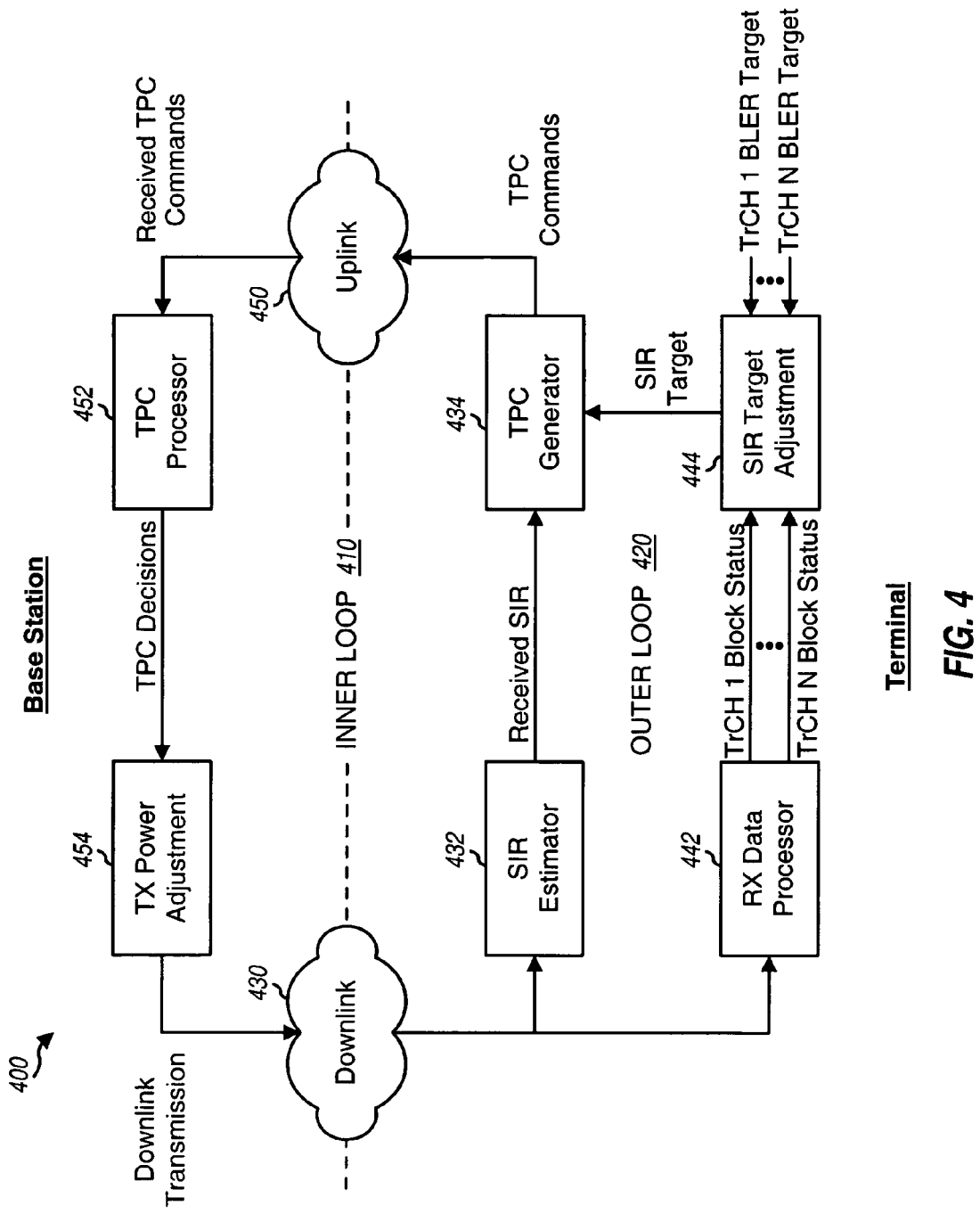
FIG. 4 shows a power control mechanism.

FIG. 4 shows a power control mechanism 400 that may be used to control the transmit power for a downlink transmission sent on a physical channel (e.g., the downlink DPCH) from a base station to a terminal. Power control mechanism 400 includes an inner loop 410 and an outer loop 420.

Inner loop 410 attempts to maintain the received SIR for the downlink transmission, as measured at the terminal, as close as possible to the SIR target for the physical channel. For inner loop 410, an SIR estimator 432 estimates or measures the received SIR for the downlink transmission (e.g., based on the dedicated pilot in Pilot field 326 shown in FIG. 3) and provides the received SIR to a TPC generator 434. TPC generator 434 also receives the SIR target from an adjustment unit 444, compares the received SIR against the SIR target, and generates a TPC command based on the result of the comparison. The TPC command is either an UP command to direct an increase in transmit power for the downlink transmission or a DOWN command to direct a decrease in transmit power. One TPC command is generated for each slot in W-CDMA and is sent on the uplink (cloud 450) to the base station.

The base station processes the uplink transmission from the terminal and obtains a received TPC command for each slot. The received TPC command is an estimate of the TPC command sent by the terminal. A TPC processor 452 detects each received TPC command and provides a TPC decision, which indicates whether an UP command or a DOWN command was detected. A transmitter unit 454 then adjusts the transmit power for the downlink transmission accordingly based on the TPC decision. For W-CDMA, the TPC commands may be sent as often as 1500 times per second, thus providing a relatively fast response time for inner loop 410.

Due to path loss and fading on the downlink (cloud 430), which typically vary over time and especially for a mobile terminal, the received SIR at the terminal continually fluctuates. Inner loop 410 attempts to maintain the received SIR at or near the SIR target in the presence of changes in the downlink.

Outer loop 420 continually adjusts the SIR target such that the BLER (or Quality of Service) target(s) are achieved for the downlink transmission on the physical channel. If the physical channel carries only one transport channel, then a receive (RX) data processor 442 processes the downlink transmission and decodes the transport blocks received on the transport channel. RX data processor 442 further checks each decoded transport block to determine whether it was decoded correctly (good) or in error (erased) or not transmitted at all (DTX). Typically, a transport block is first determined to be good or not good based on a cyclic redundancy check (CRC) value included in the transport block. A transport block that is not good is then determined to be erased or DTX based on the received signal quality or the received energy for that transport block. RX data processor 442 provides the status of each decoded transport block received on the transport channel.

Again, if the physical channel carries only one transport channel, then an adjustment unit 444 receives the block status and the BLER target for the transport channel and determines the SIR target for the physical channel. In a typical communication system, the BLER target is much less than 50%. If a transport block is decoded correctly (i.e., a good block), then the received SIR at the terminal is likely to be higher than necessary and the SIR target may be reduced by a small down step. Conversely, if a transport block is decoded in error (i.e., an erased block), then the received SIR at the terminal is likely to be lower than necessary and the SIR target may be increased by a large up step. The SIR target is maintained at the same level if the terminal detects that no data blocks (i.e., DTX blocks) have been received. The down and up steps are dependent on the BLER target for the transport channel and the desired rate of convergence for the outer loop.

For W-CDMA, the physical channel carries N transport channels, where N>1. Each transport channel may be associated with a respective BLER target, as described above. RX data processor 442 would then process the downlink transmission, decode the transport blocks received on the N transport channels, check each decoded transport block, and provide the status of each decoded transport block. Adjustment unit 444 would then receive the block status and the BLER targets for the N transport channels and determine the SIR target for the physical channel. The processing by adjustment unit 444 for multiple transport channels is described in further detail below.

Each transport channel may be associated with a respective SIR target that is dependent on (1) the BLER target specified for that transport channel, (2) the transport format used for the transport channel for the current TTI, (3) the radio channel condition, and (4) possibly other factors. The SIR target for a transport channel is also referred to herein as the required SIR for the transport channel. For a given BLER target, different required SIRs may be needed for fast fading, slow fading, and additive white Gaussian noise (AWGN) channels. Moreover, each transport channel may be active, inactive, or intermittently active.

The power control techniques described herein can provide a proper SIR target for a physical channel carrying multiple transport channels with different required SIRs, even if one or more of the transport channels are inactive or intermittently active. Several exemplary outer loop designs are described below.

In a first outer loop design, a single SIR target is maintained for all of the transport channels carried by a physical channel, and this SIR target is adjusted based only on active transport channels. The SIR target is updated in each outer loop update interval (or simply, "update interval"). For this outer loop design, the SIR target is increased based on an up step $\Delta UP_{pc}$ if an erased block is received on any of the transport channels in the current update interval. The SIR target is decreased based on a down step $\Delta DN_{pc}$ if only good blocks (i.e., no erased blocks) are received in the current update interval. The SIR target is not changed if no block is received in the current update interval. The up step $\Delta UP_{pc}$ and/or down step $\Delta DN_{pc}$ may be updated whenever an erased block is received, as described below. This outer loop design effectively adjusts the SIR target based only on the active transport channels. The effectiveness is because only an active transport channel can (1) cause the SIR target to increase, whenever an erased block is received on that transport channel, and (2) affect the rate at which the SIR target is decreased, e.g., when an erased block is received on that transport channel. The first outer loop design may be implemented in various manners, some of which are described below.

Figure 5:
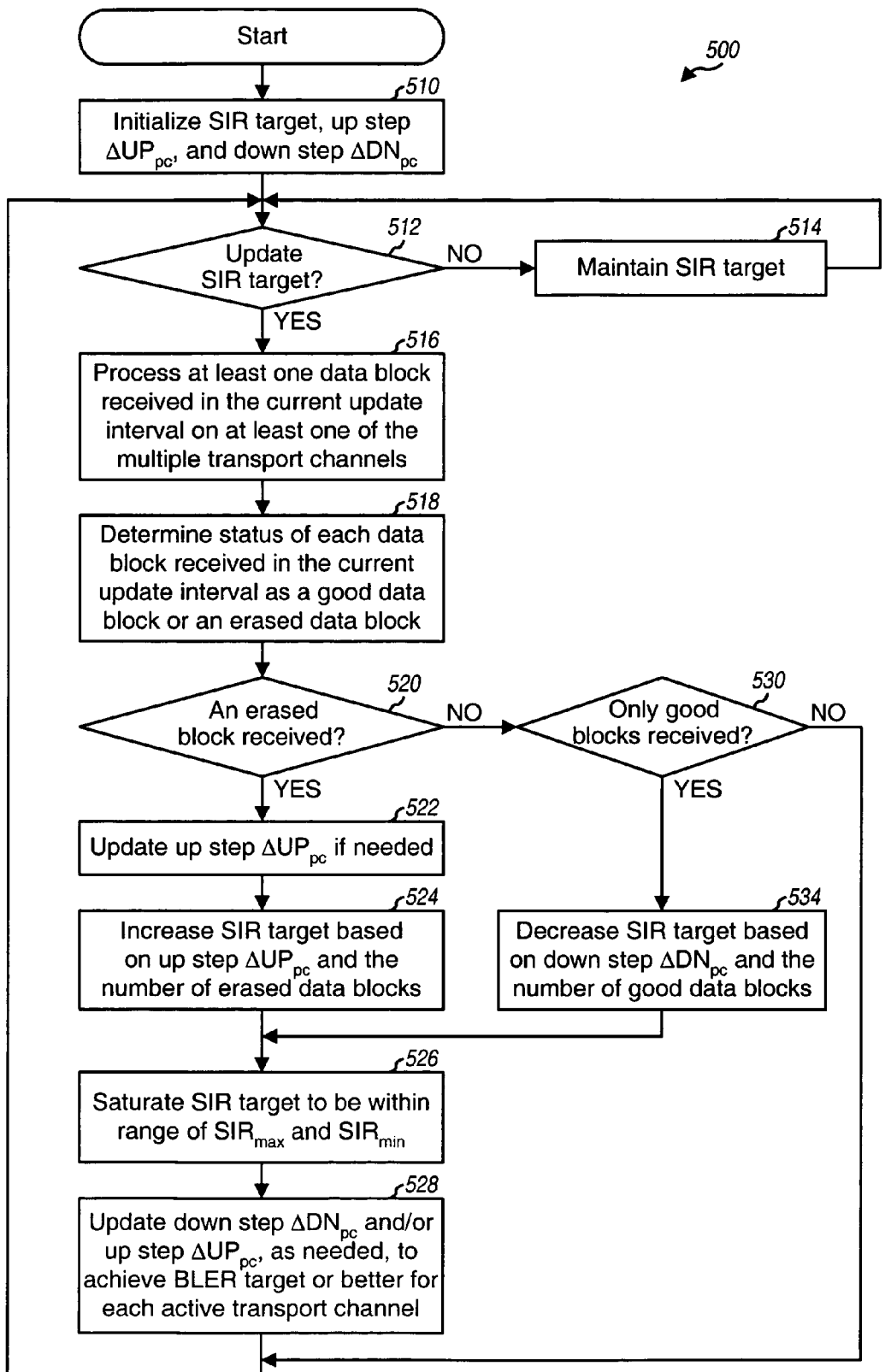
FIG. 5 shows a process for adjusting the SIR target for a physical channel carrying multiple transport channels.

FIG. 5 shows a flow diagram of a process 500 for adjusting the SIR target for a physical channel carrying multiple transport channels with different required SIRs. Process 500 is one implementation of the first outer loop design. The design also applies when there is only one transport channel carried by a physical channel.

At the start of a communication session, the SIR target for the physical channel, the up step $\Delta UP_{pc}$ used to increase the SIR target, and the down step $\Delta DN_{pc}$ used to decrease the SIR target are all initialized (step 510). The SIR target may be initialized to a fixed value that may be configured at the terminal or sent via over the air signaling. Alternatively, the SIR target may be initialized to a dynamic value that is determined based on various parameters for the data transmission on the physical channel (e.g., the BLER targets for the transport channels, the slot format for the physical channel, and so on). The up step $\Delta UP_{pc}$ and the down step $\Delta DN_{pc}$ may be initialized such that all of the transport channels carried by the physical channel can meet or exceed their BLER targets (i.e., the actual BLERs are smaller than the BLER targets). For example, the up step $\Delta UP_{pc}$ and down step $\Delta DN_{pc}$ may be set to up step size and down step size, respectively, for the most "conservative" transport channel, as described below.

A determination is periodically made whether or not the SIR target should be updated (step 512). The update interval may be a fixed time interval (e.g., each frame, the shortest TTI of all transport channels carried by the physical channel, the longest TTI of all transport channels, and so on). Alternatively, the update interval may be a variable time interval (e.g., whenever at least one data block has been received). For the embodiment shown in FIG. 5, the outer loop is updated whenever at least one data block (or transport block, in W-CDMA terminology) has been received. If the answer is 'no' for step 512, then the SIR target is maintained (step 514) and the process returns to step 512. Otherwise, the process proceeds to step 516.

In step 516, at least one data block received in the current update interval on at least one of the multiple transport channels is processed. A transport channel is considered as an active transport channel if one or more data blocks are received on the transport channel in the current update interval. The status of each data block received in the current update interval is determined as a good data block or an erased data block (step 518). This determination may be made based on a CRC value included in each data block or other metrics.

A determination is then made whether or not an erased data block has been received on any of the transport channels in the current update interval (step 520). If the answer is 'yes', then the up step $\Delta UP_{pc}$ may be updated as described below (step 522). The SIR target may then be increased (step 524), as follows:

$$SIR_{target}(k+1)=SIR_{target}(k)+\Delta UP_{pc} \cdot (NB_{erased}), \quad \text{Eq (1)}$$

where k is an index for the outer loop update interval;
 $NB_{erased}$ is the largest number of erased data blocks received on any one transport channel in the current update interval;
 $SIR_{target}(k)$ is the SIR target for the current update interval k; and
 $SIR_{target}(k+1)$ is the SIR target for the next update interval k+1.

The determination in step 520 may also be affected by other consideration such as wind-up condition not in favor of the increase.

If an erased data block has not been received in the current update interval (i.e., the answer is 'no' for step 520), then a determination is made whether or not only good data blocks have been received in the current update interval (step 530). If only good data blocks have been received, then SIR target may be decreased (step 534), as follows:

$$SIR_{target}(k+1)=SIR_{target}(k)-\Delta DN_{pc} \cdot (NB_{good}), \quad \text{Eq (2)}$$

where $NB_{good}$ is the smallest number of good data blocks received on any one transport channel in the current update interval. The determination in step 530 may also be affected by other consideration such as wind-down condition not in favor of the decrease.

If the SIR target has been adjusted in the current update interval (in either step 524 or 534), then the SIR target is saturated to be within a range of values defined by $SIR_{max}$ and $SIR_{min}$ (step 526). This saturation prevents both over and under adjustment of the SIR target. The up step $\Delta UP_{pc}$ and/or the down step $\Delta DN_{pc}$ are then updated, as needed, to meet or exceed the BLER target for each active transport channel, as described below (step 528).

Each transport channel carried by the physical channel may be associated with a respective set of up step size $\Delta UP_i$ and down step size $\Delta DN_i$ needed to achieve the BLER target for that transport channel. The up and down step sizes for each transport channel may be expressed as:

$$\Delta DN_i = \Delta UP_i \cdot \left( \frac{BLER_{target,i}}{1 - BLER_{target,i}} \right), \text{ for } i \in I, \quad \text{Eq (3)}$$

where i is an index for the transport channels;
 I is the set of all transport channels carried by the physical channel;
 $BLER_{target, i}$ is the BLER target for transport channel i;
 $\Delta UP_i$ is the up step size for transport channel i; and
 $\Delta DN_i$ is the down step size for transport channel i.

For example, if the BLER target for a given transport channel is 1%, then the up step size is 99 times the down step size. If the up step size is 0.5 decibel (dB), then the down step size is approximately 0.005 dB.

If only one transport channel j is active in the current update interval, then the up step $\Delta UP_{pc}$ and down step $\Delta DN_{pc}$ may be set for a block error event as follows:

$$\Delta DN_{pc} = \Delta DN_j, \text{ and}$$

$$\Delta UP_{pc} = \Delta UP_j. \quad \text{Eq (4)}$$

If multiple transport channels are active in the current update interval, then the up step $\Delta UP_{pc}$ and down step $\Delta DN_{pc}$ may be set in various manners. In one embodiment, the up step $\Delta UP_{pc}$ and down step $\Delta DN_{pc}$ are set for a block error event as follows:

$$\Delta UP_{pc} = \underset{j \in J}{\text{Max}}(\Delta UP_j), \text{ and/or} \quad \text{Eq (5)}$$

$$\Delta DN_{pc} = \underset{j \in J}{\text{Min}}(\Delta DN_j),$$

where j is an index for the active transport channels; and
 J is the set of all active transport channels in the current update interval.

In equation set (5), the up step $\Delta UP_{pc}$ is set to the largest up step size $\Delta UP_i$ among all of the active transport channels in the current update interval. Alternatively or additionally, the down step $\Delta DN_{pc}$ is set to the smallest down step size $\Delta DN_i$ among all of the active transport channels in the current update interval.

In another embodiment, the up step $\Delta UP_{pc}$ and down step $\Delta DN_{pc}$ are set to the up step size and down step size, respectively, for the most conservative active transport channel. For example, the same up step size may be used for all transport channels carried by the physical channel, and the down step size for each transport channel may be computed based on its BLER target as shown in equation (3). The most conservative active transport channel is then the one with the smallest down step size.

In yet another embodiment, the up step $\Delta UP_{pc}$ is set to a larger up step size (e.g., 2 dB) if an erased block is received for a new "dominating" transport channel and to a nominal up step size (e.g., 0.5 dB) otherwise. Since the first outer loop design only pays attention to the transport channels that are active, the SIR target may be too aggressive for the transport channels that are dormant. The current SIR target may be several dBs lower than the required SIR target for a transport channel that just becomes active. It may then take a few erased blocks with the nominal up step size to make up the SIR difference. For example, four erased blocks would be needed with an up step size of 0.5 dB to move the SIR target by 2 dB. Consecutive block errors are not desirable, especially for transport channels that carry important signaling messages (e.g., the DCCH). Retransmission may be used to recover erased blocks, but the timeliness of the message will suffer. To avoid this situation, a larger up step size (e.g., 2 dB) may be used when the dominating transport channel is changed. This condition may be detected, for example, by (1) maintaining a list of all active transport channels with erased blocks for each update interval, (2) comparing the list of erased active transport channels for the current update interval against the list for the previous update interval, and (3) declaring that there is a new dominating transport channel if any transport channel in the list for the current update interval is not in the list for the previous update interval. The up step $\Delta UP_{pc}$ is set to the larger up step size if there is a new dominating transport channel and to the nominal up step size otherwise. The larger up step size will reduce the number of erased blocks needed to move the current SIR target to the required SIR target. The adjustment of the up step $\Delta UP_{pc}$ may be performed in step 522 in FIG. 5. The larger up step size may be derived in various manners. For example, the deltas between the required SIR targets for all of the transport channels may be determined, and the larger up step size may be set equal to the largest of these deltas.

The up step $\Delta UP_{pc}$ and/or down step $\Delta DN_{pc}$ may also be updated in other manners while ensuring that the BLER target or better is achieved for each active transport channel. After updating the up step $\Delta UP_{pc}$ and/or down step $\Delta DN_{pc}$ as needed in step 528, the process returns to step 512.

Process 500 may be used in a straightforward manner if all of the transport channels carried by the physical channel are configured with the same TTI. In this case, the update interval may be set equal to the common TTI for all of the transport channels. However, in W-CDMA, each transport channel may be configured with a different TTI, where the TTI for each transport channel may be one, two, four, or eight frames. If the transport channels are configured with different TTIs, then process 500 may also be used in a straightforward manner by setting the update interval equal to the longest TTI of all the transport channels. This will then ensure that complete data blocks are received for each active transport channel in each update interval.

A shorter update interval (i.e., a faster update rate) is desirable for many reasons (e.g., faster outer loop response). The outer loop may be designed to support a faster update rate even if the physical channel carries multiple transport channels with different TTIs. For example, the down step sizes can be normalized to be per frame (10 ms) rather than per TTI for all of the transport channels. Then, the target may be updated as soon as any transport channel's TTI boundary is reached.

Figure 6:
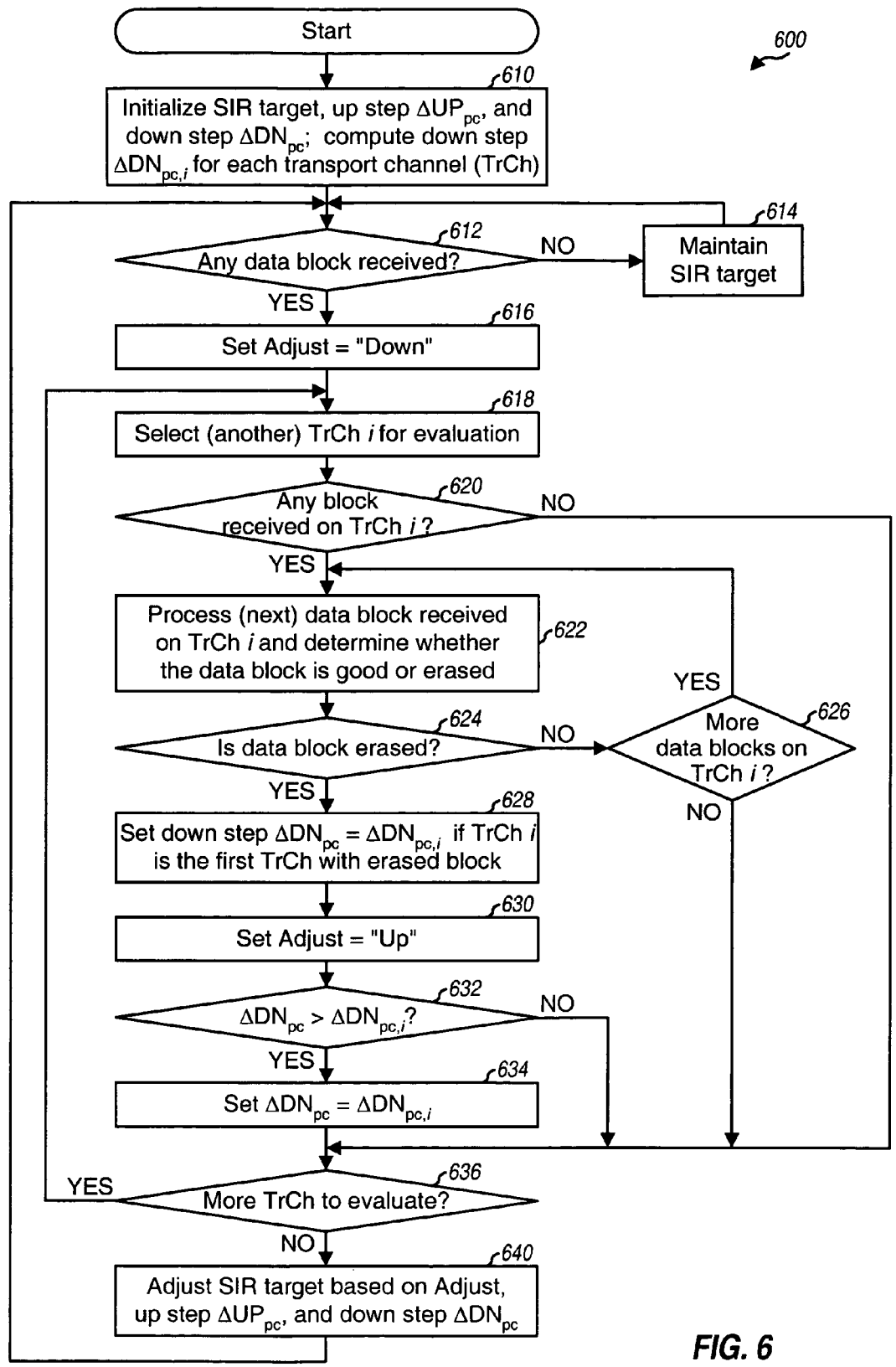
FIG. 6 shows a process for adjusting the SIR target for a physical channel carrying multiple transport channels with a single outer loop having down step adjusted based on erased data blocks.

FIG. 6 shows a flow diagram of a process 600 for adjusting the SIR target for a physical channel carrying multiple transport channels. In process 600, the SIR target is adjusted with a single outer loop, the down step $\Delta DN_{pc}$ for the outer loop is adjusted based on erased data blocks, and all of the transport channels have the same TTI. Process 600 is one specific implementation of process 500 in FIG. 5.

Initially, the SIR target for the physical channel and the up step $\Delta UP_{pc}$ and the down step $\Delta DN_{pc}$ for the outer loop are determined (step 610). The down step $\Delta DN_{pc,i}$ for each transport channel carried by the physical channel is also computed based on the up step $\Delta UP_{pc}$ and the BLER target for the transport channel, as shown in equation (3) (step 610).

A determination is periodically made (e.g., every frame or TTI) whether or not a data block has been received on any of the transport channels (step 612). If the answer is 'no', then the SIR target is maintained (step 614) and the process returns to step 612. Otherwise, the process proceeds to step 616.

In step 616, an Adjust variable is initially set to "Down". One of the transport channels (denoted as TrCh i) is then selected for evaluation (step 618). For this transport channel, a determination is first made whether or not any data blocks have been received on the transport channel (step 620). If the answer is 'no', then the process proceeds to step 636. Otherwise, a data block received on transport channel i is processed and checked to determine whether the data block is good or erased (step 622). The process proceeds to step 628 if the data block is erased (as determined in step 624) and to step 626 otherwise. In step 626, a determination is made whether or not there are any more data blocks on transport channel i that have not been processed. The process returns to step 622 to process another data block received on transport channel i if the answer is 'yes' for step 626 and proceeds to step 636 otherwise.

In step 628, the down step $\Delta DN_{pc}$ for the outer loop is set to the down step $\Delta DN_{pc,i}$ for transport channel i, if this transport channel is the first one with erased block in the current update interval (step 628). The Adjust variable is then set to "Up" (step 630). A determination is next made whether or not the down step $\Delta DN_{pc}$ for the outer loop is less than the down step $\Delta DN_{pc,i}$ for the current transport channel i being evaluated. The down step $\Delta DN_{pc}$ is set equal to the down step $\Delta DN_{pc,i}$ if $\Delta DN_{pc} > \Delta DN_{pc,i}$ (step 634) and is maintained otherwise. Although not shown in FIG. 6 for simplicity, the up step $\Delta UP_{pc}$ may also be set, for example, based on whether there is a new dominating transport channel for the current update interval, as described above. The process then proceeds to step 636.

In step 636, a determination is made whether or not there are any more transport channels to evaluate. If the answer is 'yes', then the process returns to step 618 to select another transport channel for evaluation. Otherwise, if all transport channels have been evaluated, then the SIR target is adjusted based on the Adjust variable, the up step $\Delta UP_{pc}$, and the down step $\Delta DN_{pc}$ (step 640). In particular, the SIR target is increased by the up step $\Delta UP_{pc}$ if an erased block has been received (i.e., Adjust="Up") and decreased by the down step $\Delta DN_{pc}$ if an erased block has been received (i.e., Adjust="Down").

Steps 620, 622, 624, and 626 process each data block for a given transport channel to determine whether or not an erased block has been received on that transport channel. Steps 628, 630, 632, and 634 adjust the down step $\Delta DN_{pc}$ whenever an erased block is received on any transport channel. Moreover, the down step $\Delta DN_{pc}$ is set to the smallest down step among the down steps for all transport channels with erased blocks. The current down step $\Delta DN_{pc}$ is used until the next erased block is received.

Figure 7:
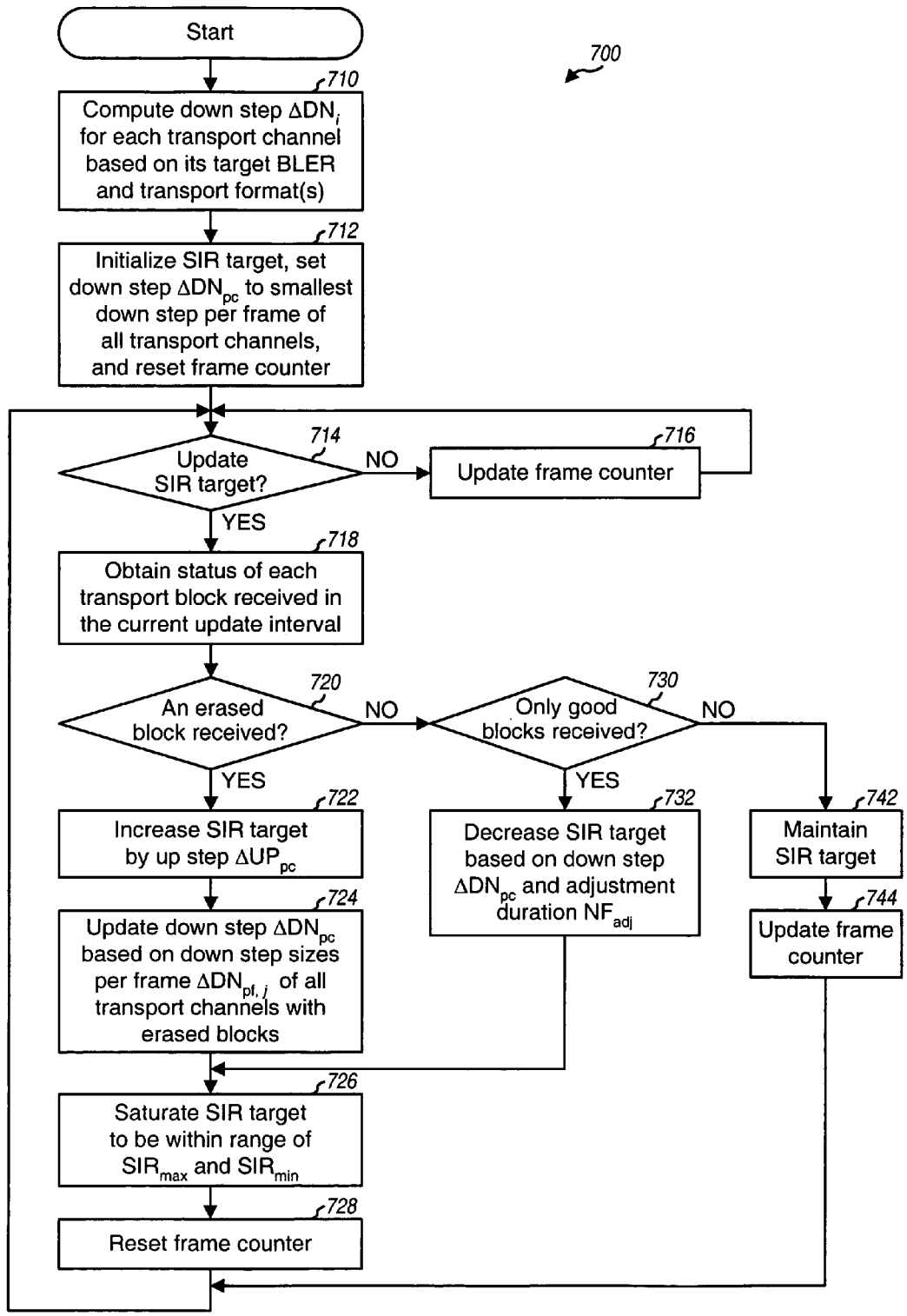
FIG. 7 shows a process for adjusting the SIR target for a physical channel carrying multiple transport channels with different transmission time intervals (TTIs)

FIG. 7 shows a flow diagram of a process 700 for adjusting the SIR target for a physical channel carrying multiple transport channels with different required SIRs and possibly different TTIs. Process 700 is another implementation of the first outer loop design and can adjust the SIR target for the physical channel at a faster rate than the longest TTI among all transport channels carried by the physical channel. For simplicity, the following description for FIG. 7 assumes that only one transport block is sent in each TTI, if at all, for each transport channel.

Initially, the down step size per frame $\Delta DN_{pf,i}$ for each transport channel carried by the physical is computed based on the up step size $\Delta UP_i$, the BLER target, and the TTI configured for that transport channel (step 710), as follows:

$$\Delta DN_{pf,i} = \Delta UP_i \cdot \frac{1}{NF_i} \cdot \left( \frac{BLER_{target,i}}{1 - BLER_{target,i}} \right), \text{ for } i \in I, \quad \text{Eq (6)}$$

where $NF_i$ is the number of frames per TTI for transport channel i;

$\Delta UP_i$ is the up step size for transport channel i; and $\Delta DN_{pf,i}$ is the down step size per frame for transport channel i, where $$\Delta DN_i = NF_i \cdot \Delta DN_{pf,i}.$$

The down step size $\Delta DN_{pf,i}$ is given as a per frame value because the SIR target may be decreased by a partial amount of the full down step size $\Delta DN_i$ if some of the reduction to the SIR target has already been performed, as described below. The up step size is not given as a per frame value because the SIR target is adjusted by the full up step size $\Delta UP_i$ whenever an erased block is received. For simplicity, the same up step size may be used for all transport channels, e.g., $\Delta UP_{pc} = \Delta UP_i = 0.5$ dB, for $i \in I$. Different down step sizes per frame may be used for different transport channels and computed as shown in equation (6).

The SIR target for the physical channel is initialized to a value (step 712). The up step $\Delta UP_{pc}$ is a fixed value and set as described above. The down step $\Delta DN_{pc}$ is a dynamic value and may be initialized to the smallest down step size per frame of all the transport channels (also in step 712), as follows:

$$\Delta DN_{pc} = \underset{i \in I}{\text{Min}}(\Delta DN_{pf,i}). \quad \text{Eq (7)}$$

A frame counter $NF_{count}$ is used to count the number of frames that have elapsed since the last adjustment to the SIR target. This frame counter is reset to zero, i.e., $NF_{count}=0$ (also in step 712).

A determination is periodically made (e.g., every frame) whether or not the SIR target for the physical channel should be updated (step 714). The SIR target may be updated at fixed time intervals, e.g., each frame, the shortest TTI of all transport channels carried by the physical channel, the longest TTI of all transport channels, and so on. Alternatively, the SIR target may be adjusted at variable time intervals, e.g., whenever at least one transport block has been received on the transport channels.

If the SIR target should not be updated yet, then the frame counter is updated (step 716). If step 714 is performed every frame, then the frame counter may be updated as follows: $NF_{count}=NF_{count}+1$. The process then returns to step 714. Otherwise, to update the SIR target, the status of each transport block received in the current update interval is obtained (step 718).

A determination is then made whether or not an erased block has been received in the current update interval on any of the transport channels (step 720). If the answer is 'yes', then the up step AUPPC may be set as described above and the SIR target is increased (step 722), as follows:

$$SIR_{target}(k+1) = SIR_{target}(k) + \Delta UP_{pc}. \quad \text{Eq (8)}$$

The down step $\Delta DN_{pc}$ for the SIR target is updated whenever an erased block is received on any transport channel (step 724). Moreover, the down step $\Delta DN_{pc}$ is set to the smallest down step size per frame among all transport channels with erased blocks in the current update interval, as follows:

$$\Delta DN_{pc} = \underset{j \in J}{\text{Min}}(\Delta DN_{pf,j}), \quad \text{Eq (9)}$$

where J is the set of all transport channels with erased blocks in the current update interval. The down step $\Delta DN_{pc}$ is thereafter used to adjust the SIR target until it is updated by another block error event. Since the SIR target has been updated, it is saturated to be within a range of values defined by $SIR_{max}$ and $SIR_{min}$ (step 726). The frame counter is reset to zero (i.e., $NF_{count}=0$) whenever the SIR target is adjusted (step 728). The process then returns to step 714.

If an erased block has not been received in the current update interval (i.e., the answer is 'no' in step 720), then a determination is made whether or not only good blocks have been received in the current update interval (step 730). If the answer is 'yes', then the SIR target is decreased based on the down step $\Delta DN_{pc}$ and the adjustment duration $NF_{adj}$ for the current update interval (step 732). Since $\Delta DN_{pc}$ denotes the amount of adjustment to the SIR target per frame, the term $NF_{adj}$ is used to indicate the number of frames for which to apply the SIR adjustment.

The adjustment duration $NF_{adj}$ may be determined as follows. First, the number of frames per TTI, $NF_g$, for each transport channel with a good block is determined, where g is an index for transport channels with good blocks in the current update interval. The minimum number of frames per TTI for all transport channels with good blocks is next determined as:

$$NF_{good} = \underset{g \in G}{\text{Max}}(NF_g),$$

where G is the set of all transport channels with good blocks in the current update interval. The number of frames since the last adjustment to the SIR target is determined based on the frame counter $NF_{count}$. The adjustment duration $NF_{adj}$ is then determined as:

$$NF_{adj}=\text{Min}(NF_{count}, NF_{good}) \qquad \text{Eq (10)}$$

The SIR target is then decreased based on the down step $\Delta DN_{pc}$ and the adjustment duration $NF_{adj}$, as follows:

$$SIR_{target}(k+1)=SIR_{target}(k)-\Delta DN_{pc} \cdot NF_{adj}. \qquad \text{Eq (11)}$$

Again, since the SIR target has been updated, it is saturated to be within the range of values defined by $SIR_{max}$ and $SIR_{min}$ (step 726). The frame counter is also reset to zero (step 728), and the process then returns to step 714.

If an erased block has not been received in the current update interval (as determined in step 720) and only good blocks have not been received (as determined in step 730), then this indicates that no transport blocks have been received in the current update interval. In that case, the SIR target is maintained at the current level (step 742) and the frame counter is updated (step 744). The process then returns to step 714.

Figure 8:
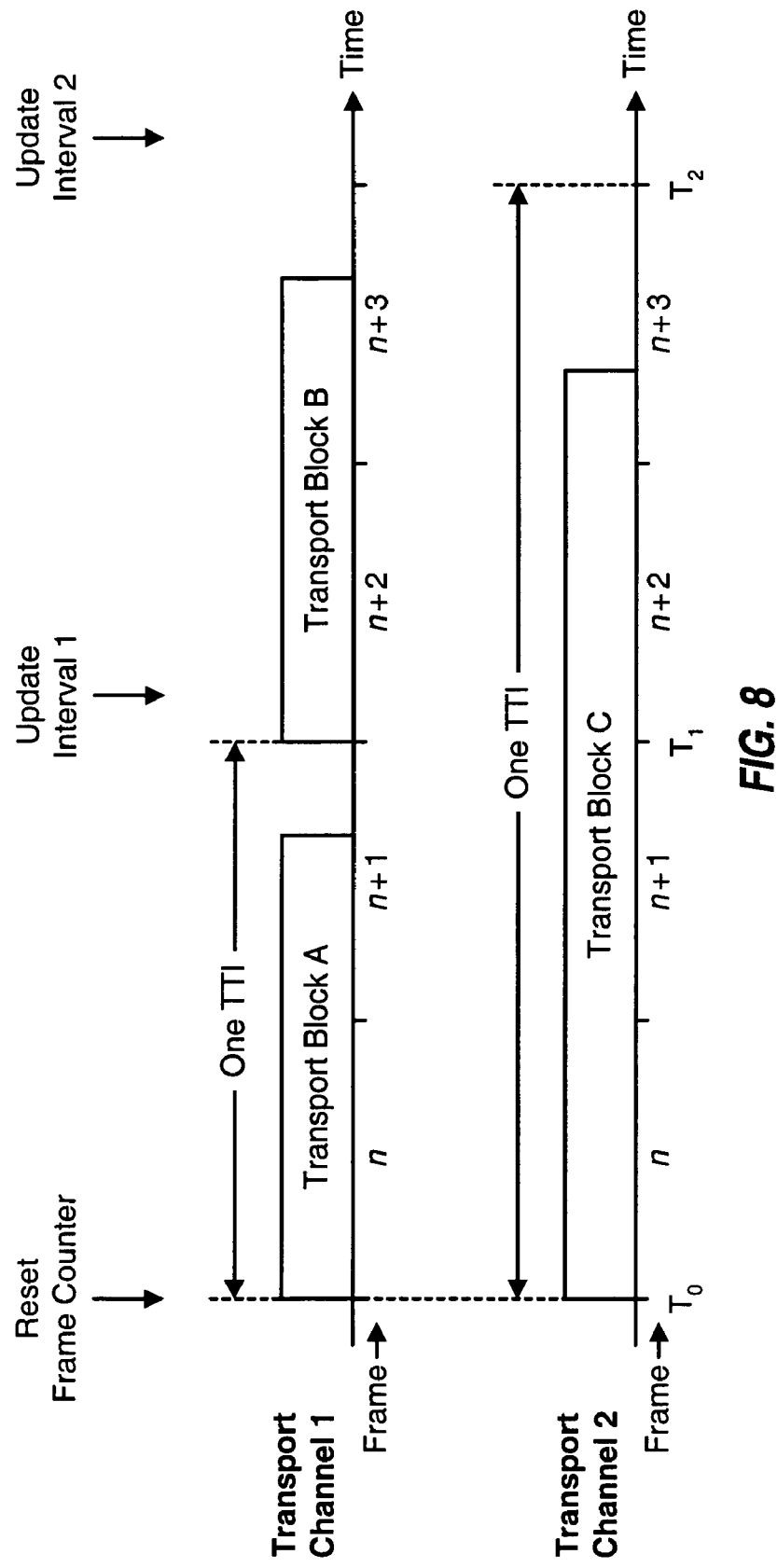
FIG. 8 shows SIR target adjustment for data transmission on a physical channel carrying two transport channels.

FIG. 8 shows a diagram of a data transmission on a physical channel carrying two transport channels 1 and 2 with TTIs of two frames and four frames, respectively. At time $T_0$, the frame counter is reset to zero, and the SIR target, up step $\Delta UP_{pc}$, and down step $\Delta DN_{pc}$ are all initialized, as described above.

At update interval 1, which is sometime after time $T_1$, transport block A has been received on transport channel 1 and the frame counter is equal to two (i.e., $NF_{count}=2$). Transport block A may be a good block, an erased block, or a DTX block. The SIR target is increased by $\Delta UP_{pc}$ if transport block A is an erased block, decreased by $2 \cdot \Delta DN_{pc}$ if transport block A is a good block, and maintained if transport block A is a DTX block. If the SIR target is adjusted, then the frame counter is reset to zero. If transport block A is an erased block, then the down step $\Delta DN_{pc}$ is set equal to the down step size per frame $\Delta DN_{pf, 1}$ for transport channel 1.

At update interval 2, which is sometime after time $T_2$, transport blocks B and C have been received on transport channels 1 and 2, respectively. Each received transport block may be a good block, an erased block, or a DTX block. The adjustment of the SIR target is dependent on the status of transport blocks A, B, and C, as follows:

(1) If either or both of transport blocks B and C are erased blocks, then the SIR target is increased by $\Delta UP_{pc}$.

(2) If transport block B is a good block and transport block C is a DTX block, then the SIR target is decreased by $2 \cdot \Delta DN_{pc}$, regardless of what might have been received for transport channel 1 in its prior TTI. This is because any adjustment to the SIR target due to a good or erased block for transport block A has already been performed in update interval 1. For this case, $NF_{count}=2$, $NF_{good}=2$, and $NF_{adj}=\text{Min}(NF_{count}, NF_{gd})=2$.

(3) If transport block C is a good block and transport block B is a DTX block, then the SIR target is decreased by $2 \cdot \Delta DN_{pc}$ if transport block A is a good or erased block and decreased by $4 \cdot \Delta DN_{pc}$ if transport block A is a DTX block. For this case, $NF_{good}=4$, $NF_{count}=2$ if transport block A is a good or erased block, and $NF_{count}=4$ if transport block A is a DTX block. $NF_{adj}$ is then equal to 2 if transport block A is a good or erased block and equal to 4 if transport block A is a DTX block. The SIR target is adjusted by $2 \cdot \Delta DN_{pc}$, instead of $4 \cdot \Delta DN_{pc}$, if the adjustment by the other $2 \cdot \Delta DN_{pc}$ has already been performed in the prior update interval 1.

(4) If transport blocks B and C are both good blocks, then the SIR target is adjusted in the same manner as described above for case (3).

(5) If transport blocks B and C are both DTX blocks, then the SIR target is maintained.

For cases (1) through (4), the frame counter is reset to zero. For case (1), the down step $\Delta DN_{pc}$ is set equal to the smallest down step size per frame among the transport channel(s) with erased blocks. The frame counter may be limited to be less than or equal to the number of frames, $NF_{max}$, for the longest TTI among the transport channels (i.e., $NF_{count} \leq NF_{max}$). However, even if this limitation is not imposed on the frame counter, an $NF_{count}$ value that is larger than $NF_{max}$ will be ignored by the Min operation in equation (10).

The embodiment shown in FIG. 7 assumes that one transport block is sent in each TTI, if at all, for each transport channel. If each transport channel is configured such that the $NB_i$ transport blocks are sent per TTI when the transport channel is active, then the SIR target may be adjusted in a manner to account for this. For example, an assumption can be made that if an error occurs for a particular TTI then all of the blocks for the TTI are in error. As another example, the likelihood of blocks being in error when an error occurs for a given TTI can be determined (e.g., via computer simulation or empirical measurement). The BLER target can then be modified to account for this likelihood (e.g., if the desired BLER target is 1%, then the BLER target for the power control can be set to 1%/0.8=1.25% (instead of 1%) if 80% of the blocks are in error for a TTI that is in error).

If each transport channel is configured such that different number of transport blocks may be sent per TTI when the transport channel is active, then the SIR target may also be adjusted in a manner to account for this.

In a second outer loop design, an individual outer loop is maintained for each of the transport channels carried by a physical channel, and the final SIR target for the physical channel is determined based only on the SIR targets for the active transport channels. For each update interval, the SIR target for each transport channel is first updated based on the transport blocks, if any, received on that transport channel and the up step $\Delta UP_i$ and down step $\Delta DN_i$ for that transport channel (e.g., similar to that shown in equations (1) and (2)).

The final SIR target for the physical channel may be obtained based on the SIR targets for the transport channels. In one embodiment, the final SIR target for the physical channel is set to the highest SIR target among all active transport channels in the current update interval. In another embodiment, the final SIR target for the physical channel is set to the highest SIR target among all transport channels.

For both embodiments, the SIR target for each transport channel may be reset to the final SIR target for the physical channel periodically or as needed to ensure that the SIR target for each transport channel is current with the final SIR target for the physical channel. For example, the SIR target for each transport channel may be reset to the final SIR target for the physical channel every TTI, whenever the transport channel is inactive for a particular time duration (e.g., N×TTIs), whenever the difference between the two SIR targets exceeds a particular threshold, and so on.

The outer loop designs described herein have certain desirable characteristics when a physical channel carries multiple transport channels. These transport channels may have different BLER targets and/or different SIR targets. Moreover, one or more of the transport channels may be inactive or intermittently active.

For a given channel type and condition, the outer loop described herein achieves the following:

Single active transport channel—if only one of the multiple transport channels is active and transport blocks are continually sent on this transport channel, then the outer loop will converge to the BLER target of this transport channel.

Change in active transport channel—if another transport channel takes over as the only active transport channel, with transport blocks being sent continually on this transport channel, then the outer loop will converge to the BLER target of the new transport channel.

Multiple active transport channels—if two or more of the transport channels are active, with transport blocks being sent continually on each active transport channel, then the outer loop will converge to the BLER target of the active transport channel with the highest SIR target. The outer loop will thus converge to meet the BLER target of at least one active transport channel. The BLER of each remaining active transport channel will be lower (i.e., better) than its BLER target.

For a transition from one channel type and condition to another channel type and condition, which may result in a change in the required SIR for each transport channel, the outer loop achieves the following:

Single active transport channel—if only one transport channel is active, then the outer loop will converge to the BLER target of this transport channel.

Multiple active transport channels—if two or more of the transport channels are active, then the outer loop will converge to the BLER target of the active transport channel with the highest SIR target.

Figure 9:
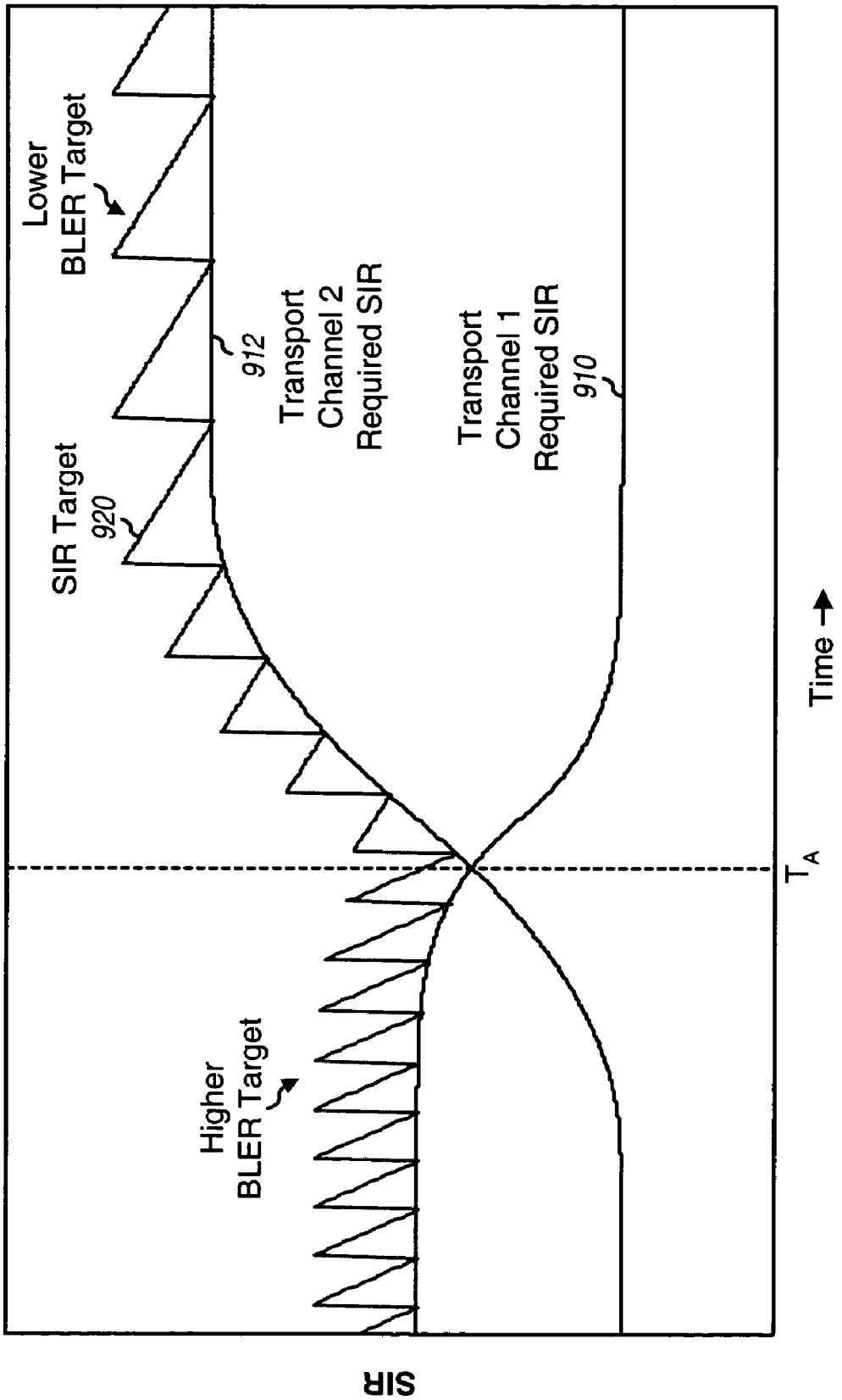
FIG. 9 shows the performance of an outer loop that maintains a single SIR target for a physical channel carrying multiple transport channels.

FIG. 9 shows the performance of the first outer loop design whereby a single SIR target is maintained for a physical channel and is adjusted by active transport channels. In this example, the physical channel carries two active transport channels 1 and 2. Plot 910 shows the required SIR for transport channel 1, plot 912 shows the required SIR for transport channel 2, and plot 920 shows the SIR target for the physical channel. Prior to time $T_A$, the required SIR for transport channel 1 is higher than the required SIR for transport channel 2, and the SIR target is adjusted by the outer loop to achieve the higher required SIR for transport channel 1. The sawtooth response for plot 920 is due to the adjustment of the SIR target by the large up step $\Delta UP_{pc}$ whenever an erased block is received and by the small down step $\Delta DN_{pc}$ whenever good blocks are received.

After time $T_A$, the required SIR for transport channel 2 is higher than the required SIR for transport channel 1. This change in the required SIR may be due to a change in the radio channel condition. The SIR target is then adjusted by the outer loop to achieve the higher required SIR for transport channel 2.

As shown in FIG. 9, the outer loop adjusts the SIR target to achieve the required SIRs or better for all active transport channels at all times. As also shown in FIG. 9, the sawtooths prior to time $T_A$ are sharper (i.e., steeper) than the sawtooths after time $T_A$. This is due to the fact that transport channel 1 has a higher BLER target, which corresponds to a larger down step size $\Delta DN_1$ for transport channel 1.

Figure 10:
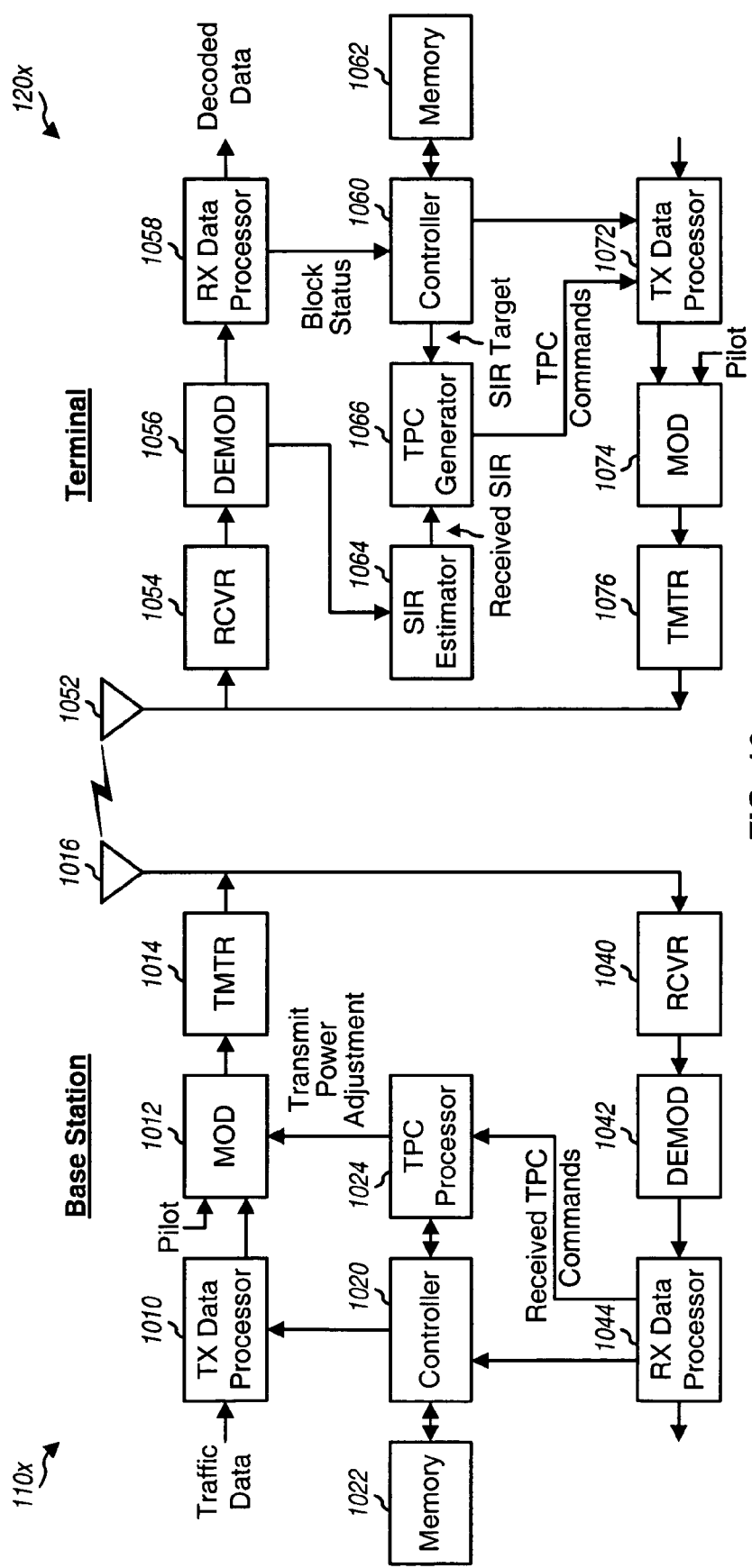
FIG. 10 shows a block diagram of a base station and a terminal.

FIG. 10 shows a block diagram of a base station 110x and a terminal 120x. Base station 110x is one of the base stations in FIG. 1, and terminal 120x is one of the terminals in FIG. 1.

At base station 110x, for downlink transmission, a transmit (TX) data processor 1010 receives traffic data for one or more transport channels, partitions the traffic data for each transport channel into transport blocks, codes each transport block in accordance with the transport format selected for that transport block, and provides transport channel data for all active transport channels. A modulator (MOD) 1012 then processes the transport channel data and overhead data and provides a sequence of complex-valued chips. For W-CDMA, the processing by modulator 1012 includes (1) multiplexing transport channel data with overhead data (as shown in FIG. 3) for each physical channel used for downlink transmission, (2) channelizing (or "spreading") the data for each physical channel with an orthogonal variable spreading factor (OVSF) code assigned to the physical channel, (3) scaling the channelized data for each physical channel based on a transmit power adjustment control for that physical channel, (4) combining the channelized data for all physical channels, and (5) spectrally spreading (or "scrambling") the combined data with a scrambling sequence assigned to base station 110x to obtain the sequence of chips. A transmitter unit (TMTR) 1014 then processes the sequence of chips to obtain a downlink signal, which is transmitted from an antenna 1016 to the terminals.

At terminal 120x, the downlink signal from base station 110x is received by an antenna 1052 and provided to a receiver unit (RCVR) 1054. Receiver unit 1054 conditions and digitizes the received signal to obtain a stream of data samples. A demodulator (DEMOD) 1056, which may be implemented with a rake receiver, then processes the data samples to obtain data symbol estimates. For W-CDMA, the processing by demodulator 1056 includes (1) descrambling the data samples with a descrambling sequence for base station 110x, (2) channelizing the descrambled samples with OVSF codes to segregate the received data onto their respective physical channels, and (3) coherently demodulating the received data for each physical channel with pilot estimates to obtain the data symbol estimates. A receive (RX) data processor 1058 then decodes the data symbol estimates for each transport block sent to terminal 120x to obtain decoded data for the transport block. RX data processor 1058 further provides the status of each received transport block (e.g., good, erased, or DTX) to a controller 1060.

The processing for an uplink transmission may be performed similarly to that described above for the downlink. The downlink and uplink processing for W-CDMA is described in documents 3GPP TS 25.211, 25.212, 25.213, and 25.214, all of which are publicly available. Controllers 1020 and 1060 direct various operations at base station 110x and terminal 120x, respectively. Memory units 1022 and 1062 store data and codes for controllers 1020 and 1060, respectively.

For downlink power control, controller 1060 may implement process 500 or 700 described above to update the target SIR for each physical channel used for downlink transmission. Controller 1060 may implement adjustment unit 444 in FIG. 4. An SIR estimator 1064 estimates the received SIR for each physical channel based on pilot symbol estimates. A TPC generator 1066 receives the SIR target for each physical channel from controller 1060 and the received SIR for each physical channel from SIR estimator 1064. TPC generator 1066 generates TPC commands for each physical channel based on the received SIR and the SIR target for that physical channel. The TPC commands are processed by a TX data processor 1072, modulated by a modulator 1074, conditioned by a transmitter unit 1076, and transmitted via antenna 1052 to base station 110x.

At base station 110x, the uplink signal from terminal 120x is received by antenna 1016, processed by a receiver unit 1040, demodulated by a demodulator 1042, and processed by an RX data processor 1044 to obtain received TPC commands. A TPC processor 1024 then detects the received TPC commands and provides TPC decisions, which are used to derive the transmit power adjustment control for each physical channel. This control is provided to modulator 1012 and used for power control of the downlink transmission to terminal 120x.

For clarity, W-CDMA terminology (e.g., transport channel, transport block, frame, TTI, SIR target, and BLER target) is used for much of the description above. In general, the techniques described herein may be used for power control of multiple channels (e.g., traffic channels, code channels, and so on) that are multiplexed together. These techniques may also be used with any unit of data (e.g., data block, packet, data frame, and so on). Moreover, each data unit may be transmitted over any time duration. The signal quality (SIR) may be quantified by signal-to-noise ratio, signal-to-interference ratio, signal-to-noise-and-interference ratio, received signal strength, pilot strength, and so on. Data transmission performance or quality may be quantified by BLER, frame error rate (FER), packet error rate (PER), bit error rate (BER), and so on.

For clarity, the power control techniques have been specifically described for the downlink in a W-CDMA system. These techniques may be used for other CDMA systems and other types of wireless communication systems that perform closed-loop power control for data transmission on multiple channels with different required SIRs. These techniques may also be used for power control on the uplink.

The power control techniques described herein may be implemented by various means. For example, these techniques may be implemented in hardware, software, or a combination thereof. For a hardware implementation, the processing units used for power control at a receiver (e.g., RX data processor 1058, controller 1060, SIR estimator 1064, and TPC generator 1066 in FIG. 10) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for power control at a transmitter (e.g., modulator 1012 and TPC processor 1024 in FIG. 10) may also be implemented within one or more ASICs, PLDs, FPGAs, and so on.

For a software implementation, the power control techniques may be implemented with modules (e.g., procedures, functions, and so on) that perform the functions described herein. The software codes may be stored in a memory unit (e.g., memory unit 1062 in FIG. 10) and executed by a processor (e.g., controller 1060). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device in a wireless communication system, comprising:

a data processor operative to process at least one data block, received in a current update interval and on at least one transport channel among a plurality of transport channels, and to provide a status of each of the at least one data block; and a controller operative to maintain a single signal quality (SIR) target for the plurality of transport channels, without maintaining an individual SIR target for each transport channel, to adjust the single SIR target based on the status of the at least one data block received in the current update interval, and to use the single SIR target for power control of data transmission on the plurality of transport channels.

2. The device of claim 1, wherein the controller is operative to increase the SIR target based on an up step if any one of the at least one data block is an erased data block and to decrease the SIR target based on a down step if all of the at least one data block are good data blocks.

3. The device of claim 2, wherein each of the plurality of transport channels is associated with a respective down step size, and wherein the up step is a fixed value and the down step is set to a smallest down step size among down step sizes for transport channels with erased data blocks in the current update interval.

4. The device of claim 2, wherein the up step is set to a first value if an erased block is received for a transport channel without an erased block in a prior update interval and set to a second value otherwise, the first value being larger than the second value.

5. An apparatus in a wireless communication system, comprising:

means for processing at least one data block, received in a current update interval and on at least one transport channel among a plurality of transport channels, and providing a status of each of the at least one data block;

means for maintaining a single signal quality (SIR) target for the plurality of transport channels, without maintaining an individual SIR target for each transport channel;

means for adjusting the single SIR target based on the status of the at least one data block received in the current update interval; and means for using the single SIR target for power control of data transmission on the plurality of transport channels.

6. A device in a wireless communication system, comprising:

a data processor operative to process at least one data block, received in a current update interval and on at least one transport channel among a plurality of transport channels, and to provide a status of each of the at least one data block; and a controller operative to maintain a single signal quality (SIR) target for the plurality of transport channels, without maintaining an individual SIR target for each transport channel, to increase the single SIR target if any one of the at least one data block received in the current update interval is an erased data block, to decrease the single SIR target if all of the at least one data block received in the current update interval are good data blocks, and to use the single SIR target for power control of data transmission on the plurality of transport channels.

7. The device of claim 6, wherein each of the at least one transport channel is associated with a respective block error rate (BLER) target, and wherein the controller is operative to increase or decrease the SIR target to meet or exceed the BLER target for each of the at least one transport channel.

8. The device of claim 6, wherein the controller is operative to increase the SIR target by an up step having an adjustable size and to decrease the SIR target by a down step having an adjustable size.

9. The device of claim 8, wherein the up step is set to a first value if an erased block is received for a transport channel without an erased block in a prior update interval and set to a second value otherwise, the first value being larger than the second value.

10. The device of claim 6, wherein the controller is operative to increase the SIR target by an up step having a fixed size and to decrease the SIR target by a down step having an adjustable size.

11. The device of claim 10, wherein each of the plurality of transport channels is associated with a respective down step size selectable as the down step used to decrease the SIR target.

12. The device of claim 11, wherein the controller is further operative to set the down step to a smallest down step size among down step sizes for transport channels with erased data blocks in the current update interval.

13. The device of claim 11, wherein the down step size for each of the plurality of transport channels is determined based on a block error rate (BLER) target and at least one transport format selected for the transport channel.

14. The device of claim 6, wherein the controller is further operative to saturate the SIR target to be within a predetermined range of values.

15. The device of claim 6, wherein each of the at least one data block received in the current update interval is associated with a respective block duration, and wherein the current update interval is shorter than a longest block duration among the at least one data block received in the current update interval.

16. A device in a wireless communication system, comprising:
a data processor operative to process at least one data block, received in a current update interval and on at least one transport channel among a plurality of transport channels, and to provide a status of each of the at least one data block; and
a controller operative to increase a signal quality (SIR) target by an up step if any one of the at least one data block received in the current update interval is an erased data block and to decrease the SIR target based on a down step and an adjustment duration if all of the at least one data block received in the current update interval are good data blocks, wherein the SIR target is used for power control of data transmission on the plurality of transport channels, wherein each of the at least one data block received in the current update interval is associated with a respective block duration, wherein the down step indicates an amount of adjustment to the SIR target per frame, and wherein the adjustment duration indicates the number of frames for which to apply the adjustment to the SIR target.

17. The device of claim 16, wherein the adjustment duration indicates the number of frames covered by a longest block duration among the at least one data block and for which an adjustment to the SIR target has not been made previously.

18. The device of claim 6, further comprising:
a transmit power control (TPC) processor operative to compare a received SIR for the data transmission against the SIR target and provide TPC commands used to adjust transmit power for the data transmission.

19. The device of claim 6, wherein the wireless communication system is a Code Division Multiple Access (CDMA) system.

20. An apparatus in a wireless communication system, comprising:
means for processing at least one data block received in a current update interval and on at least one transport channel among a plurality of transport channels;
means for determining a status of each of the at least one data block received in the current update interval as a good data block or an erased data block;
means for maintaining a single signal quality (SIR) target for the plurality of transport channels, without maintaining an individual SIR target for each transport channel;
means for increasing the single SIR target if any one of the at least one data block received in the current update interval is an erased data block;
means for decreasing the single SIR target if all of the at least one data block received in the current update interval are good data blocks; and
means for using the single SIR target for power control of data transmission on the plurality of transport channels.

21. A method of adjusting a single signal quality (SIR) target used for power control of a data transmission in a wireless communication system, comprising:
processing at least one data block received in a current update interval and on at least one transport channel among a plurality of transport channels;
determining a status of each of the at least one data block received in the current update interval as a good data block or an erased data block;
maintaining the single SIR target for the plurality of transport channels, without maintaining an individual SIR target for each transport channel;
increasing the single SIR target if any one of the at least one data block received in the current update interval is an erased data block; and
decreasing the single SIR target if all of the at least one data block received in the current update interval are good data blocks.

22. The method of claim 21, wherein the increasing the single SIR target comprises increasing the single SIR target by an up step having an adjustable size, and wherein the decreasing the single SIR target comprises decreasing the single SIR target by a down step having an adjustable size.

23. The method of claim 21, wherein the increasing the single SIR target comprises increasing the single SIR target by an up step having a fixed size, and wherein the decreasing the single SIR target comprises decreasing the single SIR target by a down step having an adjustable size.

24. The method of claim 21, further comprising:
saturating the single SIR target to be within a predetermined range of values.

25. A device in a wireless communication system, comprising:
a data processor operative to process at least one data block received in a current update interval and on at least one transport channel among a plurality of transport channels and to provide a status of each of the at least one data block; and
a controller operative to maintain a single signal quality (SIR) target for the plurality of transport channels, without maintaining an individual SIR target for each transport channel, to increase the single SIR target based on an up step if any one of the at least one data block received in the current update interval is an erased data block, to decrease the single SIR target based on a down step if all of the at least one data block received in the current update interval are good data blocks, to update the down step if any one of the at least one data block received in the current update interval is an erased data block, and to use the single SIR target for power control of data transmission on the plurality of transport channels.

26. An apparatus in a wireless communication system, comprising:
   means for processing at least one data block received in a current update interval and on at least one transport channel among a plurality of transport channels;
   means for determining a status of each of the at least one data block received in the current update interval as a good data block or an erased data block;
   means for maintaining a single signal quality (SIR) target for the plurality of transport channels, without maintaining an individual SIR target for each transport channel;
   means for increasing the single SIR target based on an up step if any one of the at least one data block received in the current update interval is an erased data block;
   means for decreasing the single SIR target based on a down step if all of the at least one data block received in the current update interval are good data blocks;
   means for updating the down step if any one of the at least one data block received in the current update interval is an erased data block; and
   means for using the single SIR target for power control of data transmission on the plurality of transport channels.

27. A method of adjusting a single signal quality (SIR) target used for power control of a data transmission in a wireless communication system, comprising:
   receiving at least one data block in a current update interval on at least one transport channel among a plurality of transport channels;
   determining a status of each of the at least one data block received in the current update interval as a good data block or an erased data block;
   maintaining the single SIR target for the plurality of transport channels, without maintaining an individual SIR target for each transport channel;
   increasing the single SIR target based on an up step if any one of the at least one data block received in the current update interval is an erased data block;
   decreasing the single SIR target based on a down step if all of the at least one data block received in the current update interval are good data blocks; and
   updating the down step if any one of the at least one data block received in the current update interval is an erased data block.

28. A method of controlling transmit power for wireless communication, comprising:
   receiving at least one data block in a current update interval on at least one transport channel among a plurality of transport channels;
   determining a status of each of the at least one data block received in the current update interval;
   maintaining a single signal quality (SIR) target for the plurality of transport channels, without maintaining an individual SIR target for each transport channel;
   adjusting the single SIR target based on the status of the at least one data block received in the current update interval; and
   using the single SIR target for power control of data transmission on the plurality of transport channels.

29. The method of claim 28, wherein the adjusting the single SIR target comprises:
   increasing the SIR target based on an up step if any one of the at least one data block is an erased data block, and
   decreasing the SIR target based on a down step if all of the at least one data block are good data blocks.

30. The method of claim 29, wherein each of the plurality of transport channels is associated with a respective down step size, and wherein the up step is a fixed value and the down step is set to a smallest down step size among down step sizes for transport channels with erased data blocks in the current update interval.

31. The method of claim 29, wherein the up step is set to a first value if an erased block is received for a transport channel without an erased block in a prior update interval and set to a second value otherwise, the first value being larger than the second value.

* * * * *

UNITED STATES PATENT AND TRADEMARK OFFICE
CERTIFICATE OF CORRECTION

PATENT NO. : 7,664,519 B2
APPLICATION NO. : 10/750302
DATED : February 16, 2010
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Twenty-eighth Day of December, 2010

David J. Kappos
*Director of the United States Patent and Trademark Office*